S. O. WALTERS.
CUSPIDOR.
APPLICATION FILED MAR. 27, 1914.

1,141,734.

Patented June 1, 1915.

Fig. 1

Fig. 2

Witnesses
H. S. McDowell
J. Stuart Freeman

Inventor
Samuel O. Walters
By Victor J. Evans
Attorney

UNITED STATES PATENT OFFICE.

SAMUEL O. WALTERS, OF ROYERSFORD, PENNSYLVANIA.

CUSPIDOR.

1,141,734.　　　　Specification of Letters Patent.　　Patented June 1, 1915.

Application filed March 27, 1914. Serial No. 827,720.

*To all whom it may concern:*

Be it known that I, SAMUEL O. WALTERS, a citizen of the United States of America, residing at Royersford, in the county of Montgomery and State of Pennsylvania, have invented new and useful Improvements in Cuspidors, of which the following is a specification.

This invention relates to receptacles and more particularly to that class commonly called cuspidors.

One of the main objects of the device is to provide a cuspidor with means located therein to thoroughly disinfect the contents of the same, so that a sanitary condition of said cuspidor is maintained at all times.

A further object of the device is to provide the usual lid or cover of a cuspidor with a series of cups containing a disinfectant, said cups being suspended from the under side of said cover, and arranged within the body of the cuspidor, so that the gases arising from the cups will be thoroughly intermingled with the contents of said cuspidor.

The invention further consists in certain novel details of construction and combination of parts hereinafter fully described, illustrated in the accompanying drawings, and specifically set forth in the appended claim.

Figure 1 is a vertical, diametrical sectional view through the preferred form of the device; and Fig. 2 is a detail perspective view of one of the disinfectant containing cups.

Referring to the drawings, similar reference characters indicate the same parts in the various figures.

A cuspidor 10 is shown as comprising the usual body portion 11, having the lid or cover 12 arranged thereon. Formed preferably integrally with the cover 12, are a series or plurality of downwardly extending lugs 13, having apertures 14, formed therein for the reception of hooks 15, pivotally connected with cups 16, comprising hollow casings 17 for the reception of a disinfectant. Formed on the end walls of the casing 17 are lugs 18, apertured at 19 for the reception of the ends of the laterally projecting end portions 20 of the hooks 15, said portions being journaled in said apertures, to pivotally support the cups 16 beneath the cover 12.

From the above description it will be noted that the cups 16 are readily accessible and are so constructed as to be easily detached from the cover 12, to replenish the supply of the disinfectant, they also being arranged so as not to come in contact with the contents of the cuspidor, as well as being hidden from view from the outside and thereby presenting an unobjectionable appearance.

It is thought that the device as described will be clearly understood by those skilled in the art to which the invention appertains, and therefore a more extended explanation has been omitted.

I claim:—

In a cuspidor, the combination with a body, of a cover therefor, said cover being provided with a central opening having its face depressed toward said central opening, lugs formed with and projecting from the underside of the cover at a point between its outer edge and the edge of said opening, hooks passing through the openings in said lugs, and cups containing disinfectant supported by said hooks wholly within the body whereby the fumes emitted from the disinfectant is confined within the body as long as possible to kill all germs contained therein.

In testimony whereof I affix my signature in presence of two witnesses.

SAMUEL O. WALTERS.

Witnesses:
　HARRY I. HIESTAND,
　WALTER F. DREIBELBIS.